(12) United States Patent
Wu et al.

(10) Patent No.: US 11,397,648 B2
(45) Date of Patent: *Jul. 26, 2022

(54) VIRTUAL MACHINE RECOVERY METHOD AND VIRTUAL MACHINE MANAGEMENT DEVICE

(71) Applicant: Huawei Technologies Co., Ltd., Shenzhen (CN)

(72) Inventors: Xiaoyuan Wu, Shenzhen (CN); Heng Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/033,103

(22) Filed: Sep. 25, 2020

(65) Prior Publication Data

US 2021/0011817 A1 Jan. 14, 2021

Related U.S. Application Data

(63) Continuation of application No. 16/002,715, filed on Jun. 7, 2018, now Pat. No. 10,817,386, which is a (Continued)

(30) Foreign Application Priority Data

Dec. 25, 2015 (CN) .......................... 201510992652.2

(51) Int. Cl.
*G06F 11/14* (2006.01)

(52) U.S. Cl.
CPC .... *G06F 11/1469* (2013.01); *G06F 2201/815* (2013.01); *G06F 2201/82* (2013.01)

(58) Field of Classification Search
CPC .......... G06F 11/1469; G06F 2201/815; G06F 2201/82; G06F 11/1484
See application file for complete search history.

(56) References Cited

U.S. PATENT DOCUMENTS

| | | | |
|---|---|---|---|
| 8,359,594 B1 * | 1/2013 | Davidson | G06F 9/45558 718/1 |
| 8,453,145 B1 * | 5/2013 | Naik | G06F 9/45537 718/1 |

(Continued)

FOREIGN PATENT DOCUMENTS

| | | |
|---|---|---|
| CN | 103235746 A | 8/2013 |
| CN | 103309682 A | 9/2013 |
| CN | 105630632 A | 6/2016 |

*Primary Examiner* — Kamini B Patel
(74) *Attorney, Agent, or Firm* — Conley Rose, P.C.

(57) ABSTRACT

A virtual machine recovery method, where after receiving a virtual machine recovery command for recovering a to-be-recovered virtual machine, a virtual machine management device obtains configuration information of the to-be-recovered virtual machine from a cloud server. Then the virtual machine management device creates, according to the configuration information, a recovered virtual machine and a local storage. After downloading basic system data from the cloud server, the recovered virtual machine is started according to the basic system data. When receiving an input/output (IO) request for accessing a first data of the to-be-recovered virtual machine, the virtual machine management device downloads the first data from the cloud server to the local storage.

20 Claims, 3 Drawing Sheets

Related U.S. Application Data continuation of application No. PCT/CN2016/111080, filed on Dec. 20, 2016.

(56) References Cited

U.S. PATENT DOCUMENTS

| | | | |
|---|---|---|---|
| 9,116,735 B2* | 8/2015 | Srinivasan | G06F 9/5077 |
| 9,760,448 B1* | 9/2017 | Per | G06F 11/14 |
| 10,817,386 B2* | 10/2020 | Wu | G06F 11/1469 |
| 2010/0049929 A1* | 2/2010 | Nagarkar | G06F 11/1415 |
| | | | 711/162 |
| 2011/0004676 A1* | 1/2011 | Kawato | G06F 8/63 |
| | | | 709/221 |
| 2011/0208929 A1* | 8/2011 | McCann | G06F 3/0664 |
| | | | 711/162 |
| 2011/0276823 A1* | 11/2011 | Ueno | G06F 11/1469 |
| | | | 714/4.11 |
| 2012/0144390 A1* | 6/2012 | Farmer | G06F 9/45558 |
| | | | 718/1 |
| 2013/0239106 A1* | 9/2013 | Srinivasan | G06F 9/5077 |
| | | | 718/1 |
| 2015/0012776 A1 | 1/2015 | Banikazemi et al. | |
| 2015/0058837 A1* | 2/2015 | Govindankutty | G06F 9/45558 |
| | | | 718/1 |
| 2015/0149813 A1* | 5/2015 | Mizuno | G06F 11/1484 |
| | | | 714/4.11 |
| 2015/0269031 A1* | 9/2015 | Wang | G06F 9/45558 |
| | | | 718/1 |
| 2016/0048408 A1* | 2/2016 | Madhu | G06F 11/2023 |
| | | | 718/1 |
| 2019/0278663 A1* | 9/2019 | Mehta | G06F 3/067 |

\* cited by examiner

FIG. 4

VIRTUAL MACHINE RECOVERY METHOD AND VIRTUAL MACHINE MANAGEMENT DEVICE

CROSS-REFERENCE TO RELATED APPLICATIONS

This application is a continuation of U.S. patent application Ser. No. 16/002,715, filed on Jun. 7, 2018, which is a continuation of International Patent Application No. PCT/CN2016/111080, filed on Dec. 20, 2016, which claims priority to Chinese Patent Application No. 201510992652.2, filed on Dec. 25, 2015. All of the aforementioned patent applications are hereby incorporated by reference in their entireties.

TECHNICAL FIELD

The present disclosure relates to the field of communications technologies, and in particular, to a virtual machine recovery method and a virtual machine management device.

BACKGROUND

As an enterprise server is gradually transferred to a virtualization platform, a physical server becomes a virtual machine, and modern backup software enhances a capability of protecting the virtual machine. To prevent virtual machine data damage or loss caused by a disaster such as a fire, a flood, or an earthquake, data in the virtual machine is usually backed up or copied to backup storage space in a different location. For example, local data in the virtual machine is backed up or copied to a cloud server. When a disaster occurs, the data in the virtual machine may be downloaded from the backup storage space such as the cloud server to recover the virtual machine.

In an existing virtual machine recovery technology, due to a limit in network bandwidth and a data backup format, if the data in the virtual machine is backed up in the cloud server, all backup data needs to be downloaded to the virtual machine first, and then the virtual machine is started. Because the virtual machine has a relatively large amount of data, it takes several hours to several days to restore all the backup data in the virtual machine to the virtual machine, a long time is consumed, and virtual machine recovery efficiency is low.

SUMMARY

This application provides a virtual machine recovery method and a virtual machine management device such that virtual machine recovery efficiency can be improved.

A first aspect provides a virtual machine recovery method, applied to a virtual machine management device, where the virtual machine management device backs up data in a to-be-recovered virtual machine to a cloud server, and the method includes receiving a virtual machine recovery command, obtaining configuration information of the to-be-recovered virtual machine from the cloud server, creating, according to the configuration information, a recovered virtual machine and a local storage unit corresponding to the recovered virtual machine, receiving a virtual machine startup command, obtaining and downloading basic system data from the cloud server, and starting the recovered virtual machine according to the basic system data, where the basic system data is data that is in an operating system and that enables the recovered virtual machine to run normally, and receiving an input/output (IO) request, determining whether data related to the IO request is stored in the local storage unit, and if the data related to the IO request is not stored in the local storage unit, downloading the data related to the IO request from the cloud server to the local storage unit, and returning data requested by the IO request.

In this application, when the virtual machine recovery command is received, the configuration information of the to-be-recovered virtual machine may be obtained from the cloud server, and the recovered virtual machine and the local storage unit of the recovered virtual machine are created according to the configuration information of the to-be-recovered virtual machine. Further, when the virtual machine startup command is received, the basic system data may be downloaded from the cloud server, and the recovered virtual machine is started according to the basic system data. Therefore, virtual machine startup efficiency is improved. After the recovered virtual machine is started, corresponding data may be downloaded from the cloud server when the IO request is received to respond to the IO request. This ensures implementation of more functions of the recovered virtual machine and improves virtual machine recovery efficiency.

With reference to the first aspect, in a first possible implementation, downloading the basic system data from the cloud server includes obtaining, by the virtual machine management device, a bitmap information of the basic system data from the cloud server, wherein the bitmap information comprises a start location and a length of sub-data in the basic system data, and downloading, by the virtual machine management device and according to the bitmap information, the basic system data in the operating system of the to-be-recovered virtual machine from the cloud server.

In this application, in a normal startup process of the virtual machine, the bitmap information that is of the basic system data and that is required for normal running of the to-be-recovered virtual machine may be recorded and stored to the cloud server. Further, during virtual machine recovery, the basic system data may be downloaded from the cloud server according to the bitmap information of the basic system data, to start the recovered virtual machine. Therefore, downloading efficiency of the basic system data of the to-be-recovered virtual machine is improved, and virtual machine startup efficiency can be improved.

With reference to the first aspect, in a second possible implementation, the data of the to-be-recovered virtual machine is divided into data blocks of a preset size, and is backed up as the divided data blocks to the cloud server.

In this application, the data in the to-be-recovered virtual machine is backed up and stored to the cloud server in a data block storage manner, making it more convenient to search and download data when the data in the to-be-recovered virtual machine is downloaded from the cloud server, and allowing remote backup data to be directly used for virtual machine recovery.

With reference to the second possible implementation of the first aspect, in a third possible implementation, the method further includes downloading, by the virtual machine management device and according to a quantity of backup times of each data block, the data blocks of the to-be-recovered virtual machine from the cloud server to the local storage unit if the data of the to-be-recovered virtual machine is incrementally backed up, where a data block with a larger quantity of backup times has a higher downloading priority.

In this application, another data block in the data in the to-be-recovered virtual machine except the basic system data may be downloaded from the cloud server in idle fragment time of responding to an access operation of the virtual machine. Therefore, time after the virtual machine is started can be fully used to download the data, virtual machine startup time is shortened, and virtual machine recovery efficiency is improved.

With reference to any one of the first aspect, or the first to the third possible implementations of the first aspect, in a fourth possible implementation, the configuration information of the to-be-recovered virtual machine may include at least one of a quantity of central processing units (CPUs), a memory size, a quantity of disks, or a size of each disk.

In this application, the recovered virtual machine that has same configuration information as those of the to-be-recovered virtual machine and the local storage unit corresponding to the recovered virtual machine may be created according to the configuration information of the to-be-recovered virtual machine such that accuracy for recovering the to-be-recovered virtual machine is improved.

A second aspect provides a virtual machine management device, where the virtual machine management device backs up data in a to-be-recovered virtual machine to a cloud server, and the virtual machine management device may include a receiving module configured to receive a virtual machine recovery command, a creation module configured to obtain configuration information of the to-be-recovered virtual machine from the cloud server, and create, according to the configuration information, a recovered virtual machine and a local storage unit corresponding to the recovered virtual machine when the receiving module receives the virtual machine recovery command, where the receiving module is further configured to receive a virtual machine startup command, a downloading module configured to obtain and download basic system data from the cloud server when the receiving module receives the startup command, and a startup module configured to start the recovered virtual machine according to the basic system data downloaded by the downloading module, where the basic system data is data that is in an operating system and that enables the recovered virtual machine to run normally, where the receiving module is further configured to receive an IO request, and the downloading module is further configured to determine whether data related to the IO request received by the receiving module is stored in the local storage unit, and if the data related to the IO request is not stored in the local storage unit, download the data related to the IO request from the cloud server to the local storage unit, and return data requested by the IO request.

With reference to the second aspect, in a first possible implementation, the virtual machine management device further includes a backup module configured to record bitmap information that is of the basic system data and that is required in a period of time from startup of the to-be-recovered virtual machine to a time at which the to-be-recovered virtual machine can run normally when the to-be-recovered virtual machine is started, where the bitmap information includes a start location and a length of sub-data in the basic system data, and store the bitmap information to the cloud server, and the downloading module is further configured to obtain the bitmap information of the basic system data from the cloud server, obtain, according to the bitmap information, the basic system data from an operating system that is of the to-be-recovered virtual machine and that is backed up in the cloud server, and download the basic system data.

With reference to the second aspect, in a second possible implementation, the backup module is further configured to divide the data in the to-be-recovered virtual machine into data blocks of a preset size, and store, when the data in the to-be-recovered virtual machine is backed up to the cloud server, the data as the data blocks obtained by means of division.

With reference to the second possible implementation of the second aspect, in a third possible implementation, the backup module is further configured to count a quantity of backup times of each data block when the data in the to-be-recovered virtual machine is incrementally backed up, and the downloading module is further configured to download, in idle time of the virtual machine management device, the data block from the cloud server according to the quantity, counted by the backup module, of backup times of each data block, where a data block with a larger quantity of backup times has a higher downloading priority.

With reference to any one of the second aspect, or the first to the third possible implementations of the second aspect, in a fourth possible implementation, the configuration information of the to-be-recovered virtual machine may include at least one of a quantity of CPUs, a memory size, a quantity of disks, or a size of each disk.

A third aspect provides a virtual machine management device, and the virtual machine management device may include a processor, a memory, a bus, and a communications interface, where the memory is configured to store a computer-executable instruction, and the processor, the memory, and the communications interface are connected using the bus, and when the virtual machine management device runs, the processor executes the computer-executable instruction stored in the memory such that the virtual machine management device performs the foregoing virtual machine recovery method according to any possible implementation of the first aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Currently, remote backup data cannot be directly used for virtual machine recovery. A virtual machine recovery technology cannot support remote backup data because of two core technical difficulties. First, during virtual machine recovery, data access usually needs to meet a bandwidth requirement of 30 megabytes per second (MB/s) (or 240 megabits per second (Mbps)), but existing access bandwidth of remote data usually cannot meet this requirement, and consequently, the remote backup data cannot be directly used for the virtual machine recovery. Second, the remote backup data is usually stored and read in sequence, and a random access requirement for backup data during virtual machine recovery cannot be met. For example, a most common manner for backing up remote data to a cloud storage server is operated using a Simple Storage Service (S3) protocol. The S3 protocol requires that data be uploaded and stored in sequence using an object as a unit, and downloaded and obtained in sequence using an object as a unit. Consequently, the remote backup data cannot be directly used for the virtual machine recovery.

In the embodiments of the present disclosure, the two technical difficulties that the remote backup data cannot be directly used for the virtual machine recovery are resolved by combining backup data pre-reading and backup data block storage. A virtual machine recovery method and a device that are provided in the embodiments of the present disclosure are described below with reference to FIG. 1 to FIG. 4.

Figure 1:
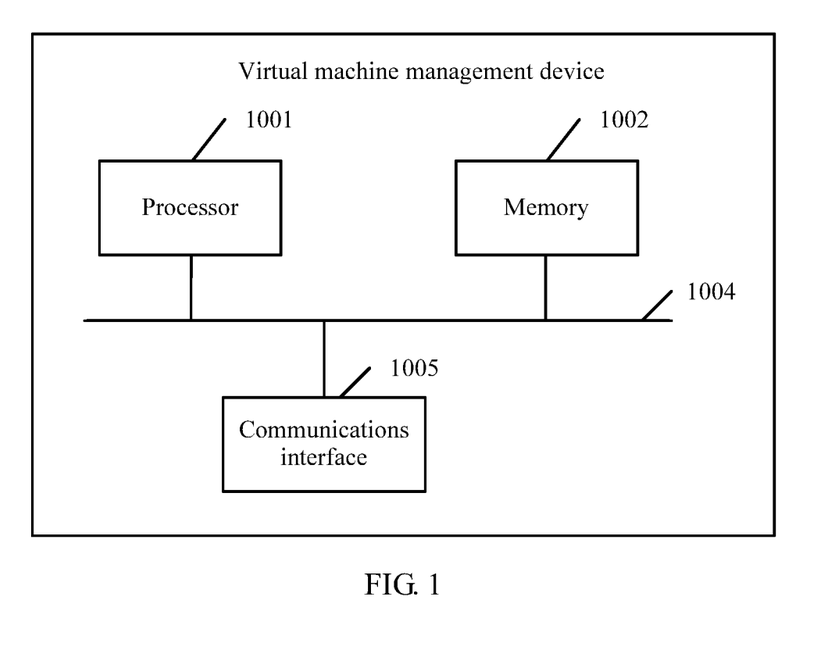
FIG. 1 is a schematic structural diagram of a virtual machine management device according to an embodiment of the present disclosure.

Referring to FIG. 1, FIG. 1 is a schematic structural diagram of a virtual machine management device according to an embodiment of the present disclosure. The virtual machine management device described in this embodiment of the present disclosure includes a processor 1001, a memory 1002, a system bus 1004, and a communications interface 1005. The processor 1001, the memory 1002, and the communications interface 1005 are connected and communicate with each other using the system bus 1004.

The processor 1001 may be a single-core or multi-core CPU, or an application-specific integrated circuit, or one or more integrated circuits configured to implement this embodiment of the present disclosure.

The memory 1002 may be a high-speed random access memory (RAM), or may be a non-volatile memory, such as at least one magnetic disk memory.

The memory 1002 is configured to store a computer-executable instruction. The processor 1001 may run the computer-executable instruction to perform a method shown in FIG. 2.

Figure 2:
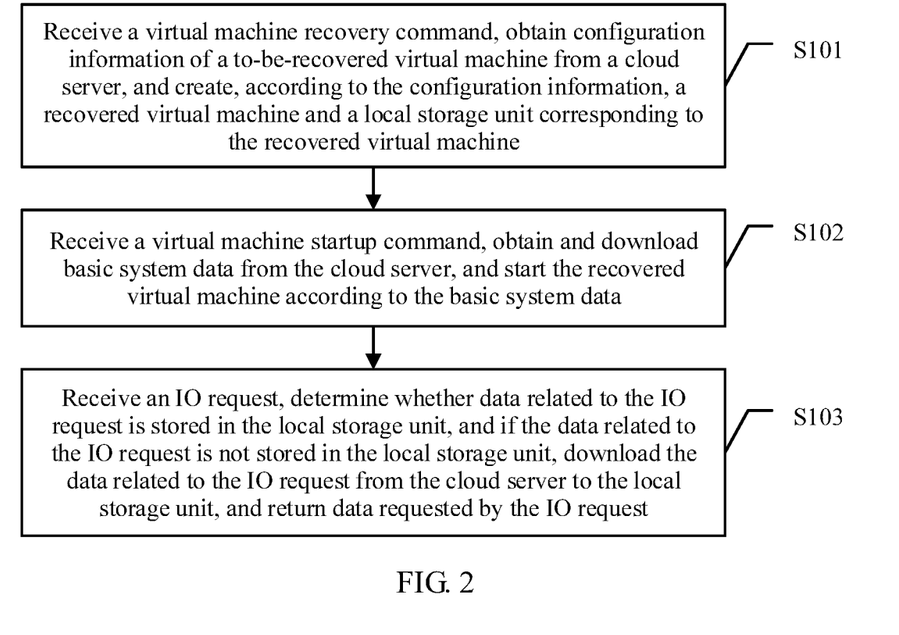
FIG. 2 is a schematic flowchart of a virtual machine recovery method according to an embodiment of the present disclosure.

Referring to FIG. 2, FIG. 2 is a schematic flowchart of a virtual machine recovery method according to an embodiment of the present disclosure. The virtual machine recovery method described in this embodiment of the present disclosure is applied to a virtual machine management device, and the virtual machine management device backs up data in a to-be-recovered virtual machine to a cloud server. The virtual machine recovery method described in this embodiment of the present disclosure includes the following steps.

Step S101. Receive a virtual machine recovery command, obtain configuration information of the to-be-recovered virtual machine from the cloud server, and create, according to the configuration information, a recovered virtual machine and a local storage unit corresponding to the recovered virtual machine.

During specific implementation, when performing a virtual machine recovery operation, a user may first send the virtual machine recovery command to the virtual machine management device according to a user operation instruction on the virtual machine management device to trigger the virtual machine management device to recover the to-be-recovered virtual machine. The to-be-recovered virtual machine is a virtual machine that requires data recovery because a fault such as data damage or loss is caused by a disaster or another reason.

After receiving the virtual machine recovery command, the virtual machine management device may obtain the configuration information of the to-be-recovered virtual machine from the cloud server, and may create, according to the configuration information of the to-be-recovered virtual machine, the recovered virtual machine and the local storage unit corresponding to the recovered virtual machine. The recovered virtual machine is a virtual machine newly created by the virtual machine management device and is used to replace the to-be-recovered virtual machine such that the data in the to-be-recovered virtual machine can be recovered to the recovered virtual machine. During specific implementation, the configuration information of the to-be-recovered virtual machine may include a quantity of CPUs of the virtual machine, a memory size, a quantity of disks, a size of each disk, or the like. This is not limited herein. After obtaining the configuration information of the to-be-recovered virtual machine from the cloud server, the virtual machine management device may create, according to the configuration information, the recovered virtual machine that has same configuration information as those of the to-be-recovered virtual machine and the local storage unit corresponding to the recovered virtual machine. The local storage unit corresponding to the recovered virtual machine may be a local disk of the recovered virtual machine. During specific implementation, storage space corresponding to the cloud server may be S3 cloud storage space. This is not limited herein.

Step S102. Receive a virtual machine startup command, obtain and download basic system data from the cloud server, and start the recovered virtual machine according to the basic system data.

During specific implementation, after creating the recovered virtual machine and the local storage unit corresponding to the recovered virtual machine, the virtual machine management device may output creation complete notification information to a user operation interface of the virtual machine management device for the user to look up. After determining that the recovered virtual machine and the local storage unit corresponding to the recovered virtual machine are created, the user may send the virtual machine startup command to the virtual machine management device according to a related operation instruction on the virtual machine management device, to trigger the virtual machine management device to start the recovered virtual machine.

After receiving the virtual machine startup command, the virtual machine management device may obtain and download the basic system data of the to-be-recovered virtual machine from the cloud server, and start the recovered virtual machine according to the basic system data. The basic system data is data that is in an operating system and that enables the recovered virtual machine to run normally. During specific implementation, the operating system that is of the to-be-recovered virtual machine and that is backed up and stored in the cloud server includes two parts of data. One part is the basic system data of the operating system, that is, data used to enable the virtual machine to run normally, such as a driver. The other part is an application program built in or attached to the operating system. The application program built in the operating system may include a painter, a calculator, a tablet, or the like in attachments. Further, the application program attached to the operating system may be an application program set by the user in a quick launch bar, or the like.

During specific implementation, the virtual machine management device may back up the data in the to-be-recovered virtual machine to the cloud server when the to-be-recovered virtual machine is in a normal working state, that is, before the to-be-recovered virtual machine is faulty. Further, in a normal startup process of the to-be-recovered virtual machine, the virtual machine management device may record bitmap information that is of the basic system data and that is required in a period of time from startup of the to-be-recovered virtual machine to a time at which the to-be-recovered virtual machine can run normally, and store the bitmap information to the cloud server, to back up the basic system data of the to-be-recovered virtual machine. The bitmap information of the basic system data includes a start location and a length of sub-data in the basic system data.

After creating the recovered virtual machine, the virtual machine management device may obtain the bitmap information of the basic system data from the cloud server, find, according to the start location and the length of the sub-data in the basic system data that are in the bitmap information, the basic system data from the operating system that is of the to-be-recovered virtual machine and that is backed up in the cloud server, and download the basic system data to the recovered virtual machine, to start the recovered virtual machine according to the basic system data.

During specific implementation, when backing up the data in the to-be-recovered virtual machine to the cloud server, the virtual machine management device may divide the data in the to-be-recovered virtual machine into data blocks of a preset size, and store, when backing up the data to the cloud server, the data as the data blocks obtained by means of division. The virtual machine management device stores the data in the to-be-recovered virtual machine in blocks. During virtual machine recovery, the data may be downloaded in a data block manner such that the virtual machine management device may first obtain and download the basic system data from the cloud server and start the recovered virtual machine according to the basic system data. Therefore, virtual machine recovery efficiency is improved.

Step S103. Receive an IO request, determine whether data related to the IO request is stored in the local storage unit, and if the data related to the IO request is not stored in the local storage unit, download the data related to the IO request from the cloud server to the local storage unit, and return data requested by the IO request.

During specific implementation, after the virtual machine management device starts the recovered virtual machine, the user may perform a data read/write operation on the recovered virtual machine. The user may perform an operation according to the user operation instruction on the virtual machine management device, and send the IO request to the virtual machine management device. The IO request may include request instructions corresponding to a data read operation and a data write operation. This is not limited herein. After receiving the IO request, the virtual machine management device may first determine whether the data related to the IO request is stored in the local storage unit. For example, after receiving a request instruction of the read operation, the virtual machine management device may first determine whether data that the request instruction of the read operation requests to read is stored in the local storage unit. If the data requested by the IO request is stored in the local storage unit, the data requested by the IO request may be directly returned. If the data requested by the IO request is not stored in the local storage unit, the virtual machine management device may download the data requested by the IO request from the cloud server to the local storage unit, and return the data requested by the IO request.

Figure 3:
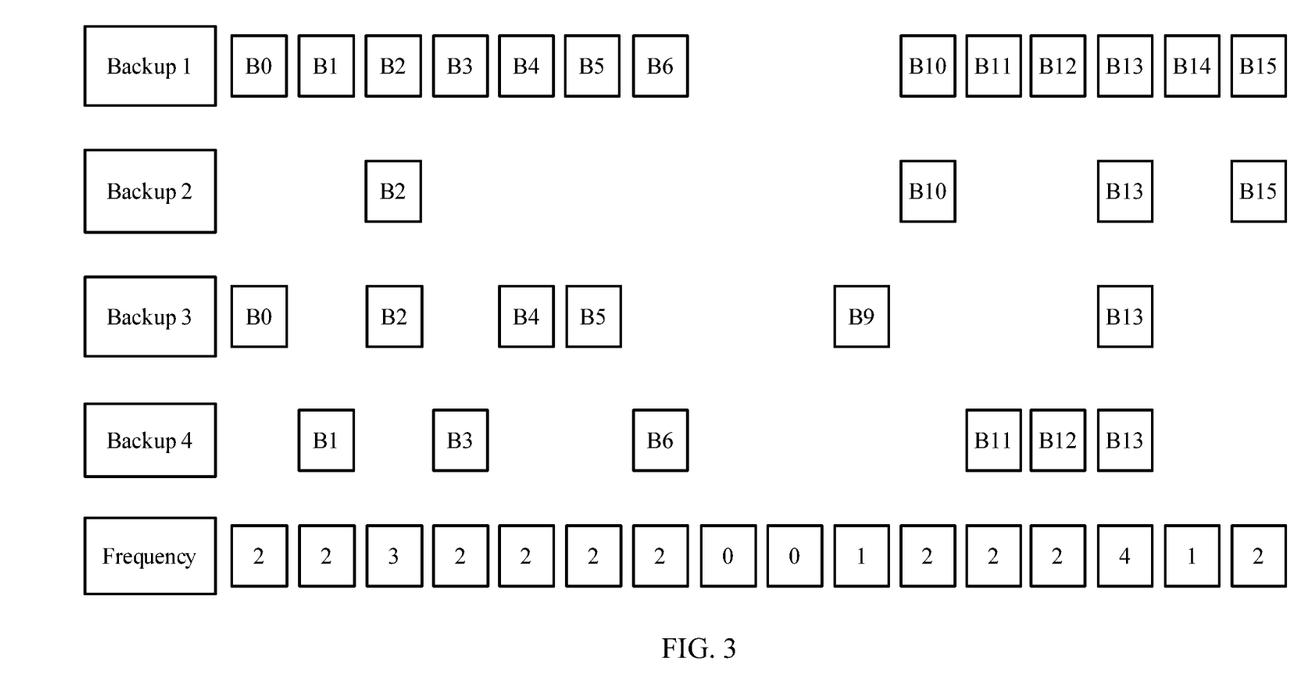
FIG. 3 is a schematic diagram of counting a quantity of incremental backup times of a data block according to an embodiment of the present disclosure.

Further, when backing up the data in the to-be-recovered virtual machine, the virtual machine management device may back up the data in the to-be-recovered virtual machine in an incremental backup manner. The incremental backup is a backup manner in which data that has been modified in a time interval from previous backup to current backup is backed up and data that has not been modified is not backed up. That is, only changed data is backed up, and unchanged data is not backed up. Therefore, whether a data block is active data may be determined according to a quantity of times that the data block appears in the incremental backup. When backing up the data in the to-be-recovered virtual machine incrementally, the virtual machine management device may count a quantity of backup times of each data block, and download the data block from the cloud server according to the counted quantity of backup times of each data block in idle time of the virtual machine management device. A data block with a larger quantity of backup times has a higher downloading priority. As shown in FIG. 3, FIG. 3 is a schematic diagram of counting a quantity of incremental backup times of a data block. Backup 1 to backup 4 represent a first time of incremental backup to a fourth time of incremental backup. B0, B1, B2, . . . , and B15 represent a data block 0, a data block 1, a data block 2, . . . , and a data block 15. A frequency represents a quantity of incremental backup times of each data block. A data block with a larger quantity of incremental backup times is more frequently used. As shown in FIG. 3, B13 is incrementally backed up four times, and the quantity of incremental backup times of B13 is greater than a quantity of incremental backup times of another data block. It can be learned that B13 is most frequently used. B2 is incrementally backed up three times, and the quantity of incremental backup times of B2 is less than the quantity of incremental backup times of B13 and greater than a quantity of incremental backup times of another data block. It can be learned that B2 is used less frequently than B13 and more frequently than the other data block. The virtual machine management device may determine that the data blocks have descending downloading priorities in descending order of quantities of backup times of the data blocks, and may download the data blocks in descending order of the priorities. A data block that is more frequently used is preferably downloaded to ensure that the recovered virtual machine recovers a function of the to-be-recovered virtual machine more quickly.

In this embodiment of the present disclosure, the virtual machine management device may back up and store the data in the to-be-recovered virtual machine to the cloud server in a data block storage manner, and may download the basic system data of the virtual machine from the cloud server according to the bitmap information, such as the location and the length of the basic system data, required for virtual machine startup, and start the recovered virtual machine according to the basic system data. The IO request of an access operation of the virtual machine may be responded to after the recovered virtual machine is started. If data needs to be downloaded from the S3 cloud storage space in the access operation, the corresponding data is downloaded from the S3 cloud storage space and is written into the local storage unit to respond to the access operation of the virtual machine. Further, the virtual machine management device may download another data block in the data in the to-be-recovered virtual machine except the basic system data from the cloud server in idle fragment time of responding to the access operation of the virtual machine. Therefore, time after the virtual machine is started can be fully used to download the data, virtual machine startup time is shortened, and virtual machine recovery efficiency is improved.

Figure 4:
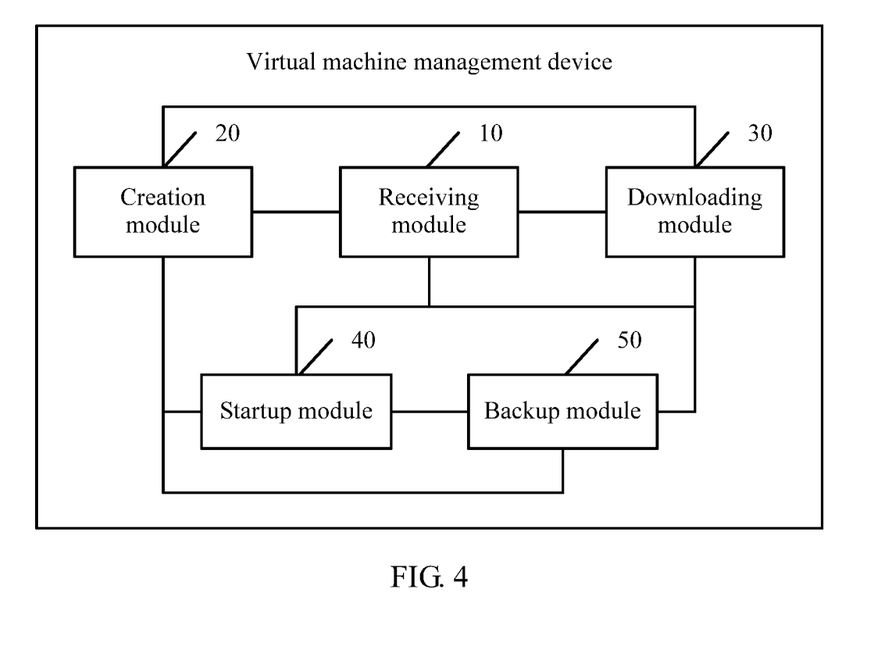
FIG. 4 is a schematic structural diagram of a virtual machine management device according to another embodiment of the present disclosure.

Referring to FIG. 4, FIG. 4 is a schematic structural diagram of a virtual machine management device according to another embodiment of the present disclosure. The virtual machine management device described in this embodiment of the present disclosure includes a receiving module 10 configured to receive a virtual machine recovery command, a creation module 20 configured to obtain configuration information of the to-be-recovered virtual machine from the cloud server when the receiving module 10 receives the virtual machine recovery command, and create, according to the configuration information, a recovered virtual machine and a local storage unit corresponding to the recovered virtual machine, where the receiving module 10 is further configured to receive a virtual machine startup command, a downloading module 30 configured to obtain and download basic system data from the cloud server when the receiving module 10 receives the startup command, and a startup module 40 configured to start the recovered virtual machine according to the basic system data downloaded by the downloading module 30, where the basic system data is data that is in an operating system and that enables the recovered virtual machine to run normally.

The receiving module 10 is further configured to receive an IO request.

The downloading module 30 is further configured to determine whether data related to the IO request received by the receiving module 10 is stored in the local storage unit, and if the data related to the IO request is not stored in the local storage unit, download the data related to the IO request from the cloud server to the local storage unit, and return data requested by the IO request.

In some feasible implementations, the virtual machine management device described in this embodiment of the present disclosure further includes a backup module 50 configured to record bitmap information that is of the basic system data and that is required in a period of time from startup of the to-be-recovered virtual machine to a time at which the to-be-recovered virtual machine can run normally when the to-be-recovered virtual machine is started, where the bitmap information includes a start location and a length of sub-data in the basic system data, and store the bitmap information to the cloud server.

The downloading module 30 is further configured to obtain the bitmap information of the basic system data from the cloud server, obtain, according to the bitmap information, the basic system data from an operating system that is of the to-be-recovered virtual machine and that is backed up in the cloud server, and download the basic system data.

In some feasible implementations, the backup module 50 is further configured to divide the data in the to-be-recovered virtual machine into data blocks of a preset size, and store, when the data in the to-be-recovered virtual machine is backed up to the cloud server, the data as the data blocks obtained by means of division.

In some feasible implementations, the backup module 50 is further configured to count a quantity of backup times of each data block when the data in the to-be-recovered virtual machine is incrementally backed up.

The downloading module 30 is further configured to download, in idle time of the virtual machine management device, the data block from the cloud server according to the quantity, counted by the backup module, of backup times of each data block. A data block with a larger quantity of backup times has a higher downloading priority.

During specific implementation, the virtual machine management device may be configured to perform the implementations described in the embodiment of the virtual machine recovery method provided in the embodiments of the present disclosure. For details, refer to the implementations described in the steps of the embodiment. Details are not described herein again.

In this embodiment of the present disclosure, the virtual machine management device may back up and store the data in the to-be-recovered virtual machine to the cloud server in a data block storage manner, and may download the basic system data of the virtual machine from the cloud server according to the bitmap information, such as the location and the length of the basic system data, required for virtual machine startup, and start the recovered virtual machine according to the basic system data. The IO request of an access operation of the virtual machine may be responded to after the recovered virtual machine is started. If data needs to be downloaded from S3 cloud storage space in the access operation, the corresponding data is downloaded from the S3 cloud storage space and is written into the local storage unit to respond to the access operation of the virtual machine. Further, the virtual machine management device may download another data block in the data in the to-be-recovered virtual machine except the basic system data from the cloud server in idle fragment time of responding to the access operation of the virtual machine. Therefore, time after the virtual machine is started can be fully used to download the data, and virtual machine startup time is shortened. During data block downloading, a sequence of downloading related data may be determined according to a quantity of backup times of the data block, and a data block that is more frequently used is preferably downloaded, to ensure normal use of the recovered virtual machine and improve virtual machine recovery efficiency.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for recovering a virtual machine implemented by a virtual machine management device, wherein the method comprises:
sending bitmap information to a cloud server distinct from the virtual machine management device, wherein the bitmap information identifies a start location and a length of sub-data in basic system data of a to-be-recovered virtual machine, and wherein the basic system data comprises data in an operating system of the to-be-recovered virtual machine enabling the to-be-recovered virtual machine to run;
receiving a virtual machine recovery command for recovering the to-be-recovered virtual machine;
obtaining configuration information of the to-be-recovered virtual machine;
creating, according to the configuration information, a recovered virtual machine;
obtaining, from the cloud server, the bitmap information;
obtaining, based on the bitmap information and from the cloud server, the basic system data; and
starting the recovered virtual machine according to the basic system data without performing a full restore of the recovered virtual machine.

2. The method of claim 1, further comprising:
recording quantities of back up times for data blocks corresponding to the to-be-recovered virtual machine by recording, for each data block of the data blocks, a quantity of times the data block has been backed up; and
downloading the data blocks from the cloud server in idle times of the recovered virtual machine and in a sequence that is based on the quantities.

3. The method of claim 1, further comprising:
receiving an input/output (IO) request for accessing first data; and
downloading the first data to a local storage of the recovered virtual machine when the first data is not stored in the local storage.

4. The method of claim 3, wherein the first data is downloaded after and separately from the basic system data.

5. The method of claim 3, wherein the first data is previously stored in a cloud storage system as a back-up of the to-be-recovered virtual machine.

6. The method of claim 1, further comprising receiving, prior to starting the recovered virtual machine, a virtual machine startup command.

7. The method of claim 1, wherein the configuration information comprises one or more of a quantity of central processing units, a memory size, a quantity of disks, or a size of each disk.

8. A virtual machine management device, comprising:
a memory configured to store computer-executable instructions; and
a processor coupled to the memory and configured to execute the computer-executable instructions to cause the virtual machine management device to be configured to:
send bitmap information to a cloud server distinct from the virtual machine management device, wherein the bitmap information identifies a start location and a length of sub-data in basic system data of a to-be-recovered virtual machine, and wherein the basic system data comprises data in an operating system of the to-be-recovered virtual machine enabling the to-be-recovered virtual machine to run;
receive a virtual machine recovery command for recovering the to-be-recovered virtual machine;
obtain configuration information of the to-be-recovered virtual machine;
create, according to the configuration information, a recovered virtual machine;
obtain, from the cloud server, the bitmap information;
obtain, based on the bitmap information and from the cloud server, the basic system data; and
start the recovered virtual machine according to the basic system data without a full restore of the recovered virtual machine.

9. The virtual machine management device of claim 8, wherein the computer-executable instructions further cause the virtual machine management device to be configured to:
record quantities of back up times for data blocks corresponding to the to-be-recovered virtual machine by recording, for each data block of the data blocks, a quantity of times the data block has been backed up; and
download the data blocks from the cloud server in idle times of the recovered virtual machine and in a sequence that is based on the quantities.

10. The virtual machine management device of claim 8, wherein the computer-executable instructions further cause the virtual machine management device to be further configured to:
receive an input/output (IO) request for accessing first data; and
download the first data to a local storage of the recovered virtual machine when the first data is not stored in the local storage.

11. The virtual machine management device of claim 10, wherein the first data is downloaded after and separately from the basic system data.

12. The virtual machine management device of claim 10, wherein the first data is previously stored in a cloud storage system as a back-up of the to-be-recovered virtual machine.

13. The virtual machine management device of claim 8, wherein the computer-executable instructions further cause the virtual machine management device to be configured to receive, prior to starting the recovered virtual machine, a virtual machine startup command.

14. The virtual machine management device of claim 8, wherein the configuration information comprises one or more of a quantity of central processing units, a memory size, a quantity of disks, or a size of each disk.

15. A computer program product comprising instructions that are stored on a non-transitory medium and that, when executed by a processor, cause a virtual machine management device to:
send bitmap information to a cloud server distinct from the virtual machine management device, wherein the bitmap information identifies a start location and a length of sub-data in basic system data of a to-be-recovered virtual machine, and wherein the basic system data comprises data in an operating system of the to-be-recovered virtual machine enabling the to-be-recovered virtual machine to run;
receive a virtual machine recovery command for recovering the to-be-recovered virtual machine;
obtain configuration information of the to-be-recovered virtual machine;
create, according to the configuration information, a recovered virtual machine;
obtain, from the cloud server, the bitmap information;
obtain, based on the bitmap information and from the cloud server, the basic system data; and
start the recovered virtual machine according to the basic system data without a full restore of the recovered virtual machine.

16. The computer program product of claim 15, wherein the instructions further cause the virtual machine management device to be configured to:
record quantities of back up times for data blocks corresponding to the to-be-recovered virtual machine by recording, for each data block of the data blocks, a quantity of times the data block has been backed up; and download the data blocks from the cloud server in idle times of the recovered virtual machine and in a sequence that is based on the quantities.

17. The computer program product of claim 15, wherein the instructions further cause the virtual machine management device to be configured to:

receive an input/output (IO) request for accessing first data; and download the first data to a local storage of the recovered virtual machine when the first data is not stored in the local storage.

18. The computer program product of claim 17, wherein the first data is downloaded after and separately from the basic system data.

19. The computer program product of claim 15, wherein the instructions further cause the virtual machine management device to be configured to prior to starting the recovered virtual machine, receive a virtual machine startup command.

20. The computer program product of claim 15, wherein the configuration information comprises one or more of a quantity of central processing units, a memory size, a quantity of disks, or a size of each disk.

* * * * *